(12) United States Patent
Jeon

(10) Patent No.: US 12,175,626 B2
(45) Date of Patent: Dec. 24, 2024

(54) IMAGE STITCHING METHOD AND SYSTEM FOR RELAYING 3D VR IMAGES IN REAL TIME

(71) Applicant: VENTAVR CO., LTD, Seoul (KR)

(72) Inventor: Woo Yeol Jeon, Goyang-si (KR)

(73) Assignee: VENTAVR CO.,LTD, Seoul (KR)

( * ) Notice: Subject to any disclaimer, the term of this patent is extended or adjusted under 35 U.S.C. 154(b) by 0 days.

(21) Appl. No.: 18/693,152

(22) PCT Filed: Oct. 7, 2022

(86) PCT No.: PCT/KR2022/015174
§ 371 (c)(1),
(2) Date: Mar. 18, 2024

(87) PCT Pub. No.: WO2023/059144
PCT Pub. Date: Apr. 13, 2023

(65) Prior Publication Data
US 2024/0265491 A1    Aug. 8, 2024

(30) Foreign Application Priority Data

Oct. 7, 2021    (KR) .......................... 10-2021-0133355

(51) Int. Cl.
| | | |
|---|---|---|
| *G06T 3/4038* | (2024.01) | |
| *G06T 5/50* | (2006.01) | |
| *G06T 5/80* | (2024.01) | |
| *G06T 19/00* | (2011.01) | |

(52) U.S. Cl.
CPC ............. *G06T 3/4038* (2013.01); *G06T 5/50* (2013.01); *G06T 5/80* (2024.01); *G06T 19/006* (2013.01)

(58) Field of Classification Search
None
See application file for complete search history.

(56) References Cited

U.S. PATENT DOCUMENTS

| | | | |
|---|---|---|---|
| 11,301,968 B1* | 4/2022 | Lebrun | ...................... G06T 5/77 |
| 2018/0278916 A1* | 9/2018 | Kim | ........................ G03B 37/04 |
| 2019/0012818 A1* | 1/2019 | Fine | ..................... H04N 5/2624 |

FOREIGN PATENT DOCUMENTS

| KR | 20170096071 A | 8/2017 |
|---|---|---|
| KR | 20190053565 A | 5/2019 |
| KR | 102012717 B1 | 8/2019 |

(Continued)

OTHER PUBLICATIONS

Office Action of KIPO for Korean application No. 10-2021-0133355, issued on Jun. 28, 2022.

(Continued)

*Primary Examiner* — Leon Viet Q Nguyen
(74) *Attorney, Agent, or Firm* — NKL Law; Byungwoong Park

(57) ABSTRACT

The present disclosure relates to an image stitching method for relaying 3D VR images in real time. The present disclosure includes the steps of: receiving, by an image reception unit, a captured first circle image and second circle image from a binocular camera; applying, by an ST map application unit, an ST map to each of the first circle image and the second circle image; and converting, by a sphere map conversion unit, the ST-map-applied first circle image and second circle image into a first sphere image and a second sphere image, respectively, through stitching.

2 Claims, 4 Drawing Sheets

(56) References Cited

FOREIGN PATENT DOCUMENTS

| KR | 20190105102 A | 9/2019 |
| KR | 20190120619 A | 10/2019 |
| KR | 20210084248 A | 7/2021 |

OTHER PUBLICATIONS

Notice of Allowance of KIPO for Korean application No. 1020220131973, issued on Oct. 5, 2022.
WIPO International Search Report for PCT/KR2022/015174, issued on Jan. 26, 2023.

* cited by examiner

IMAGE STITCHING METHOD AND SYSTEM FOR RELAYING 3D VR IMAGES IN REAL TIME

TECHNICAL FIELD

The present disclosure relates to an image stitching method and system for relaying 3D VR images in real time, and particularly to, an image stitching method and system for relaying 3D VR images in real time that enables real-time photorealistic-based 3D VR relaying by transforming circle images, not pre-recorded 3D VR images, into a sphere map through stitching.

BACKGROUND ART

As the demand for immersive images increases, 3D virtual reality (VR)-based image content is being applied not only to VOD services but also to live streaming services. In general, 3D VR images may be viewed through an image processing device such as an HMD. When a 3D VR image is driven, the HMD outputs a left-eye image and a right-eye image with binocular disparity for some images corresponding to the viewing area, allowing a user to feel a sense of three-dimensionality and distance.

When 3D VR images are transmitted through live streaming, such as sports broadcasting, a relay service is provided by capturing 180-degree 3D circle images through a binocular camera. However, when the sphere images of both eyes are combined, visual fatigue occurs due to misalignment.

The related art patent, Korean Patent Application Publication No. 10-2021-0084248 (VR content relay platform providing method and device thereof), merely discloses technology for converting and transmitting VR video data for VR video streaming.

SUMMARY

Technical Problems

An aspect of the present disclosure is directed to providing an image stitching method and system for relaying 3D VR images in real time that transforms circle images into a sphere map through stitching and performs steric stabilization to enable real-time relaying of 180-degree 3D VR images, thereby resolving the alignment mismatch between left-eye and right-eye images.

Technical Solution

An image stitching method for relaying 3D VR images in real time of an embodiment of the present disclosure includes: receiving, by an image reception unit, a captured first circle image and second circle image from a binocular camera; applying, by an ST map application unit, an ST map to each of the first circle image and the second circle image; and converting, by a sphere map conversion unit, the ST-map-applied first circle image and second circle image into a first sphere image and a second sphere image, respectively, through stitching.

An image stitching system for relaying 3D VR images in real time of an embodiment of the present disclosure includes: an image reception unit that receives a captured first circle image and second circle image from a binocular camera; an ST map application unit that applies an ST map to each of the first circle image and the second circle image; a sphere map conversion unit that converts the ST-map-applied first circle image and second circle image into a first sphere image and a second sphere image, respectively, through stitching; a steric stabilization unit that performs steric stabilization on the first sphere image and the second sphere image; a correction unit that performs correction to remove some areas of the first sphere image and the second sphere image; and an output unit that merges the first sphere image and the second sphere image to output a 180-degree image.

Effect of Invention

According to an embodiment of the present disclosure, real-time relaying of 180-degree 3D VR images with immersion and less fatigue is possible by resolving the alignment mismatch between left-eye and right-eye images.

BRIEF DESCRIPTION OF THE DRAWING

FIGS. 3A to 6 are diagrams illustrating an image stitching method for relaying 3D VR images according to an embodiment of the present disclosure.

DETAILED DESCRIPTION OF EXEMPLARY EMBODIMENTS

Figure 1:
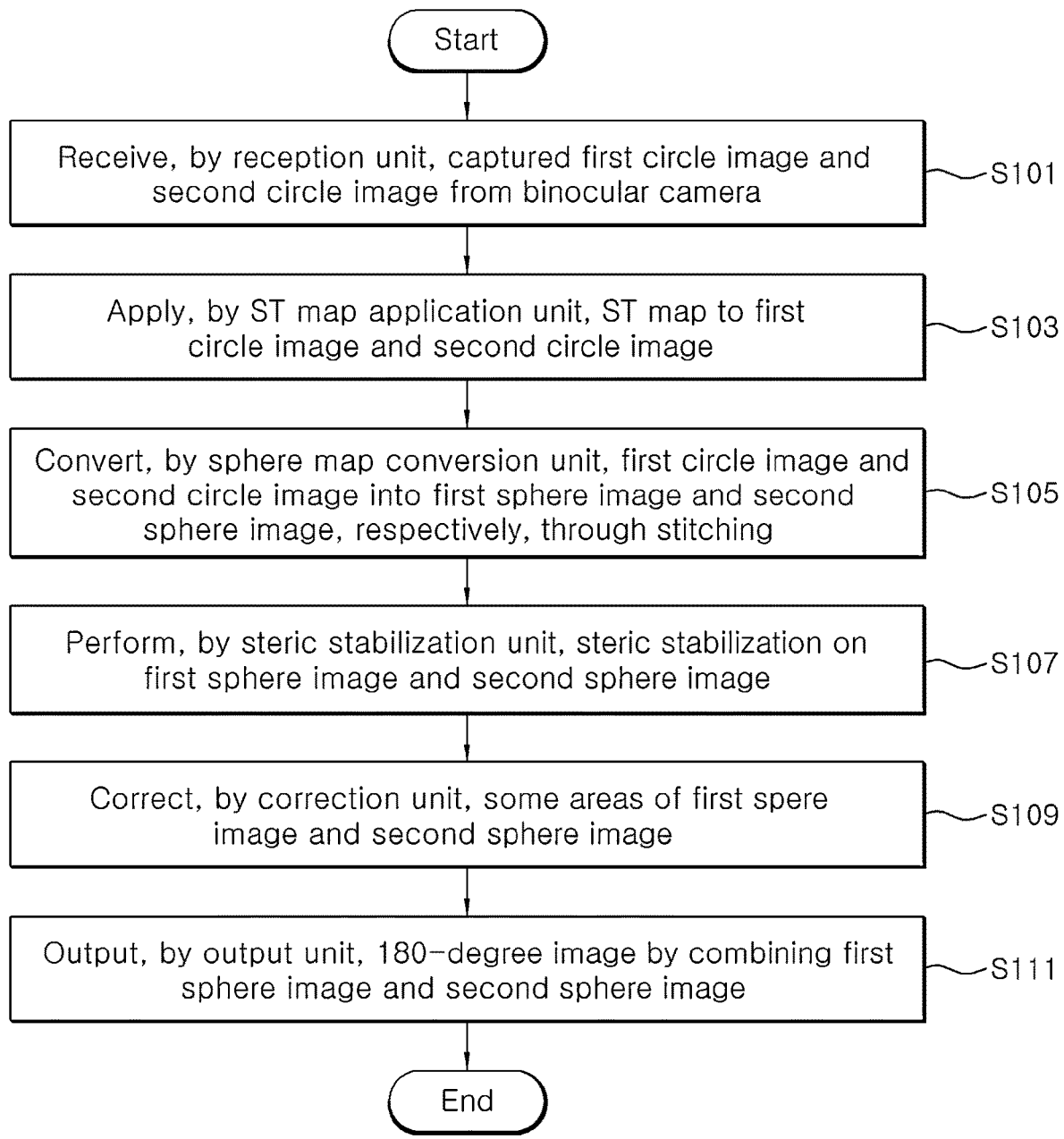
FIG. 1 is a flowchart illustrating an image stitching method for relaying 3D VR images in real time according to an embodiment of the present disclosure.

As specific structural or functional descriptions for the embodiments according to the concept of the present disclosure disclosed herein are merely exemplified for purposes of describing the embodiments according to the concept of the present disclosure, the embodiments according to the concept of the present disclosure may be embodied in various forms and are not limited to the embodiments described herein.

While the embodiments of the present disclosure are susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure.

The terms used herein are presented for the description of the specific embodiments but are not intended to limit the present disclosure. The terms in singular form may include plural forms unless otherwise specified. It will be understood that the terms "comprising" or "having," when used herein, specify the presence of stated features, integers, steps, operations, elements, components, or combinations thereof, but do not preclude the presence or addition of one or more other features, integers, steps, operations, elements, components, and/or combinations thereof.

Hereinafter, embodiments of the present disclosure will be described in detail with reference to the accompanying drawings.

FIG. 1 is a flowchart illustrating an image stitching method for relaying 3D VR images in real time according to an embodiment of the present disclosure.

Referring to FIG. 1, in the image stitching method for relaying 3D VR images in real time, first, an image reception unit receives first and second circle images captured from a binocular camera (S101).

An ST map application unit applies an ST map to the first and second circle images, respectively (S103).

A sphere map conversion unit converts each of the first and second circle images to which the ST map is applied into a first sphere image and a second sphere image through stitching (S105). In other words, the curved image may be converted through an HMD planar image transform system to support left-eye and right-eye modes suitable for 180-degree 3D transmission.

A steric stabilization unit performs steric stabilization on the first sphere image and the second sphere image (S107).

A correction unit performs correction to remove some areas of the first sphere image and the second sphere image for which steric stabilization has been completed (S109).

An output unit merges the corrected first and second sphere images and outputs a 180-degree image (S111).

Figure 2:
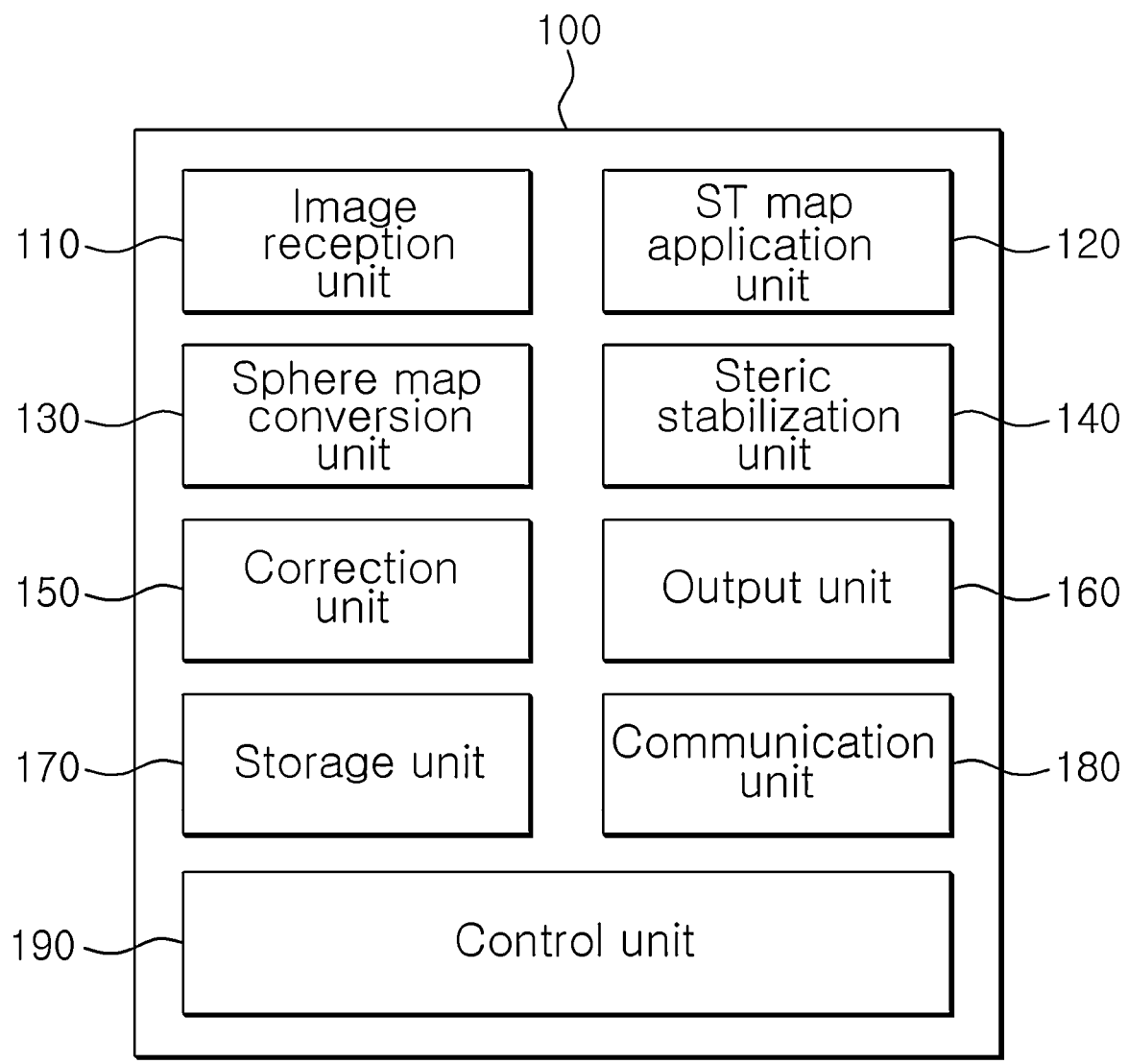
FIG. 2 is a configuration diagram illustrating an image stitching system for relaying 3D VR images in real time according to an embodiment of the present disclosure.
Figure 3:
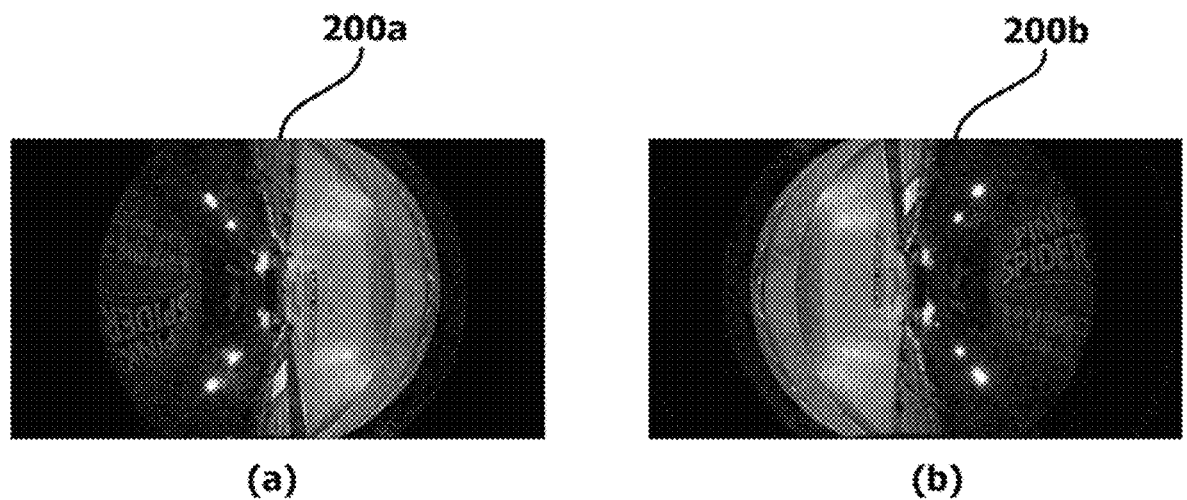
Figure 4:
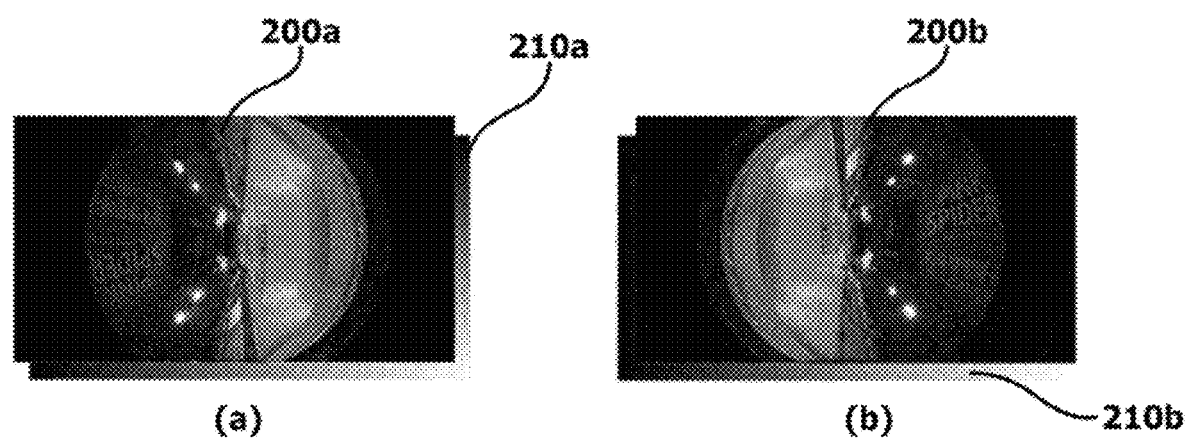
Figure 5:
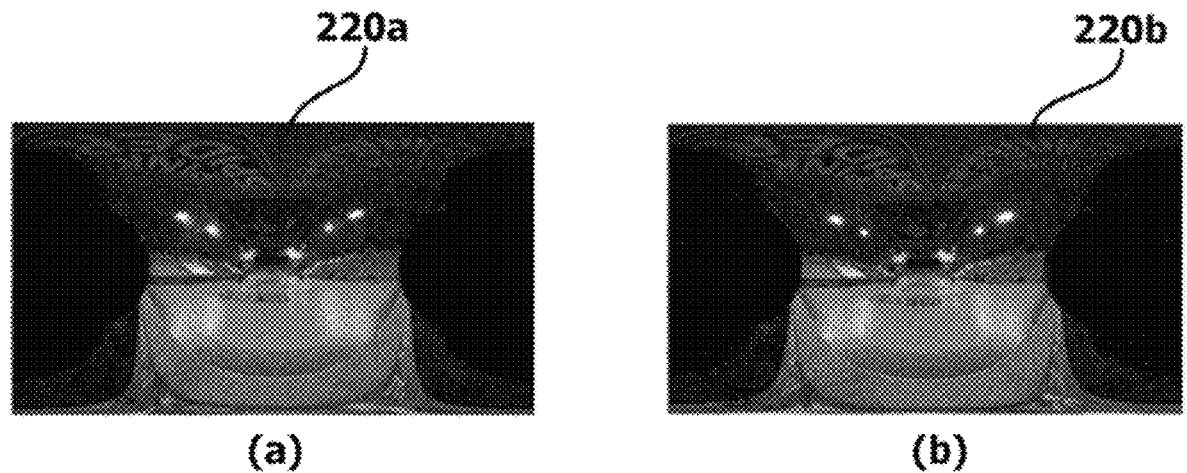

FIG. 2 is a configuration diagram illustrating an image stitching system for relaying 3D VR images in real time according to an embodiment of the present disclosure.

Referring to FIG. 2, an image stitching system 100 for relaying 3D VR images in real time includes an image reception unit 110, an ST map application unit 120, a sphere map conversion unit 130, a steric stabilization unit 140, a correction unit 150, an output unit 160, a storage unit 170, a communication unit 180, and a control unit 190.

The image reception unit 110 receives the first circle image and the second circle image captured from the binocular camera.

The ST map application unit 120 applies the ST map to the first circle image and the second circle image, respectively. The ST map may be a map of information about a location of the original image and a degree of distortion. The ST map may be an image expressed in the form of x- and y-axis coordinates by applying vector2 to each location. Based on the point (0,0) in the lower left, it is possible to set the end of each screen at 1 and set the coordinates accordingly using the formula of 1/resolution. The x-axis and y-axis of the screen may be set to correspond to red (R) and green (G). As it moves toward (0,1), it has a value of green (0,1,0), and as it moves toward (1,0), it has a value of red (1,0,0). Thereby, the ST map may be expressed as a gradient plate. The ST map may be created using some pieces of information from the functions and resources of the camera that captured the original image.

The sphere map conversion unit 130 converts each of the first circle image and the second circle image to which the ST map is applied into the first sphere image and the second sphere image through stitching.

The steric stabilization unit 140 performs steric stabilization on the first sphere image and the second sphere image. The steric stabilization unit 140 performs steric stabilization to address an issue that visual fatigue may occur due to alignment mismatch when viewing an anaglyph image by combining the first sphere image and the second sphere image. The steric stabilization unit 140 extracts the ST map added by the ST map application unit from the first sphere image and the second sphere image. The correction unit 150 performs correction to remove some areas of the first sphere image and the second sphere image. The output unit 160 merges the first sphere image and the second sphere image and outputs a 180-degree 3D VR image.

The storage unit 170 stores the received first circle image and the second circle image, and stores the first sphere image and the second sphere image. Additionally, the storage unit 170 stores the 180-degree 3D VR image merged in the output unit.

The communication unit 180 may transmit and receive data with a broadcast transmission system using a wired or wireless communication module to transmit 3D VR images in real time.

The control unit 190 is installed with operating software to control each component of the image stitching system 100 and may control the image reception unit, ST map application unit, sphere map conversion unit, steric stabilization unit, correction unit, output unit, storage unit, and communication unit.

FIGS. 3A to 6 are diagrams illustrating an image stitching method for relaying 3D VR images according to an embodiment of the present disclosure.

In FIGS. 3A and 3B, the image reception unit receives a first circle image 200a and a second circle image 200b received from the binocular camera. The first circle image is a left eye image, the second circle image is a right eye image, and the first and second circle images are left-right inverted images. Left-eye and right-eye images captured by the binocular camera are captured and received in a circle form of image prototype.

FIG. 4A is a diagram in which a pre-produced ST map 210a is applied to the first circle image, and FIG. 4B is a diagram in which a pre-produced ST map 210b is applied to the second circle image.

FIG. 5A is a diagram of converting the first circle image into the first sphere image through stitching after applying the ST map, and FIG. 5B is a diagram of converting the second circle image into the second sphere image through stitching after applying the ST map.

Figure 6:

FIG. 6 illustrates a 3D VR live streaming transmission screen, where steric stabilization is performed and unnecessary portions are removed to transmit 180-degree left-eye and right-eye images. Visual fatigue may be alleviated through steric stabilization.

While the present disclosure has been described in connection with the exemplary embodiments illustrated in the drawings, they are merely illustrative and the present disclosure is not limited to these embodiments. It will be appreciated by a person having an ordinary skill in the art that various equivalent modifications and variations of the embodiments can be made without departing from the spirit and scope of the present disclosure. Therefore, the true technical scope of the present disclosure should be defined by the technical spirit of the appended claims.

The invention claimed is:

1. An image stitching method for relaying 3D VR (Three-Dimensional Virtual Reality) images in real time, the method comprising:
 receiving, by an image reception unit, a captured first circle image and second circle image from a binocular camera;
 applying, by a map application unit, a map to each of the first circle image and the second circle image, wherein the map is expressed in a form of x- and y-axis coordinates (x, y), based on a point (0, 0) in a lower left of the map, each of a vertical and a horizontal end of the map is set as 1, and the x- and y-axis coordinates are set using a formula of 1/a resolution of the map;
 converting, by a sphere map conversion unit, the map-applied first circle image and the map-applied second circle image into a first sphere image and a second sphere image, respectively, through stitching;

performing, by a steric stabilization unit, steric stabilization on the first sphere image and the second sphere image;

performing, by a correction unit, correction to remove some areas of the first sphere image and the second sphere image for which the steric stabilization has been completed; and merging, by an output unit, the corrected first sphere image and the second sphere image to output a 180-degree image, wherein:

the map includes information about a location of at least one of the captured first circle image and the captured second circle image and a degree of distortion; and the steric stabilization unit extracts the map added by the map application unit from the first sphere image and the second sphere image.

2. An image stitching system for relaying 3D VR images in real time, the system comprising:

an image reception unit that receives a captured first circle image and second circle image from a binocular camera;

an map application unit that applies an map to each of the first circle image and the second circle image, wherein the map is expressed in a form of x- and y-axis coordinates (x, y), based on a point (0, 0) in a lower left of the map, each of a vertical and a horizontal end of the map is set as 1, and the x- and y-axis coordinates are set using a formula of 1/a resolution of the map;

a sphere map conversion unit that converts the map-applied first circle image and the map-applied second circle image into a first sphere image and a second sphere image, respectively, through stitching;

a steric stabilization unit that performs steric stabilization to extract the map added by the map application unit from the first sphere image and the second sphere image;

a correction unit that performs correction to remove some areas of the first sphere image and the second sphere image; and an output unit that merges the first sphere image and the second sphere image to output a 180-degree image, wherein the map includes information about a location of at least one of the captured first circle image and the captured second circle image and a degree of distortion.

* * * * *